(12) United States Patent
Cook et al.

(10) Patent No.: US 9,966,188 B2
(45) Date of Patent: May 8, 2018

(54) WIRELESS POWER BRIDGE

(71) Applicant: QUALCOMM Incorporated, San Diego, CA (US)

(72) Inventors: Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 14/198,322

(22) Filed: Mar. 5, 2014

(65) Prior Publication Data

US 2014/0183969 A1 Jul. 3, 2014

Related U.S. Application Data

(63) Continuation of application No. 12/040,783, filed on Feb. 29, 2008, now Pat. No. 8,729,734.

(60) Provisional application No. 60/988,758, filed on Nov. 16, 2007.

(51) Int. Cl.
| | |
|---|---|
| *H02J 17/00* | (2006.01) |
| *H01F 38/14* | (2006.01) |
| *H01Q 1/12* | (2006.01) |
| *H01Q 1/24* | (2006.01) |
| *H02J 50/12* | (2016.01) |
| *H02J 50/90* | (2016.01) |
| *H01F 5/00* | (2006.01) |
| *H01F 7/20* | (2006.01) |

(52) U.S. Cl.
CPC ........... *H01F 38/14* (2013.01); *H01Q 1/1285* (2013.01); *H01Q 1/248* (2013.01); *H02J 50/12* (2016.02); *H02J 50/90* (2016.02); *H01F 5/003* (2013.01); *H01F 7/20* (2013.01)

(58) Field of Classification Search
CPC ....................................................... H02J 17/00
USPC ........................................................ 307/104
See application file for complete search history.

(56) References Cited

U.S. PATENT DOCUMENTS

| | | | |
|---|---|---|---|
| 2,133,494 A | 10/1938 | Waters | |
| 5,428,521 A | 6/1995 | Kigawa et al. | |
| 5,929,718 A | 7/1999 | Crosby | |
| 6,430,064 B1 | 8/2002 | Tsuchimoto et al. | |
| 7,076,206 B2 | 7/2006 | Elferich et al. | |
| 7,667,352 B2 * | 2/2010 | Drechsler | H02J 5/005 307/104 |

(Continued)

FOREIGN PATENT DOCUMENTS

| | | |
|---|---|---|
| CN | 1723684 A | 1/2006 |
| CN | 1768462 A | 5/2006 |

(Continued)

OTHER PUBLICATIONS

International Search Report and Written Opinion—PCT/US2008/083723, International Search Authority—European Patent Office—dated Jun. 22, 2009.

(Continued)

*Primary Examiner* — Jared Fureman
*Assistant Examiner* — Joseph Inge
(74) *Attorney, Agent, or Firm* — Knobbe, Martens, Olson & Bear, LLP

(57) ABSTRACT

A wireless power bridge that allows magnetic transmission of energy across a solid barrier such as a wall. A circuit is described for controlling the operation.

19 Claims, 4 Drawing Sheets

(56) References Cited

U.S. PATENT DOCUMENTS

| | | |
|---|---|---|
| 7,675,197 B2 | 3/2010 | Tetlow et al. |
| 7,728,551 B2 | 6/2010 | Reed et al. |
| 7,741,734 B2 | 6/2010 | Joannopoulos et al. |
| 7,825,543 B2 | 11/2010 | Karalis et al. |
| 2004/0130915 A1 | 7/2004 | Baarman |
| 2004/0130916 A1 | 7/2004 | Baarman |
| 2005/0127867 A1 | 6/2005 | Calhoon et al. |
| 2005/0127869 A1 | 6/2005 | Calhoon et al. |
| 2005/0131495 A1 | 6/2005 | Parramon et al. |
| 2007/0021140 A1* | 1/2007 | Keyes, IV .............. H02J 17/00 455/522 |
| 2007/0178945 A1 | 8/2007 | Cook et al. |
| 2007/0182367 A1* | 8/2007 | Partovi .................. H01F 5/003 320/108 |
| 2007/0222542 A1 | 9/2007 | Joannopoulos et al. |
| 2008/0061778 A1 | 3/2008 | Takahashi et al. |
| 2008/0067874 A1 | 3/2008 | Tseng |
| 2008/0191897 A1 | 8/2008 | McCollough |
| 2008/0245422 A1 | 10/2008 | McTargett |
| 2009/0127937 A1 | 5/2009 | Widmer et al. |
| 2009/0157145 A1 | 6/2009 | Cauller |
| 2010/0072825 A1 | 3/2010 | Azancot et al. |
| 2010/0181841 A1 | 7/2010 | Azancot et al. |

FOREIGN PATENT DOCUMENTS

| | | | |
|---|---|---|---|
| CN | 1768467 A | 5/2006 | |
| CN | 1813384 A | 8/2006 | |
| CN | 1950914 A | 4/2007 | |
| CN | 1954472 A | 4/2007 | |
| EP | 0558316 A1 | 9/1993 | |
| JP | 3212134 A | 9/1991 | |
| JP | H0614480 A | 1/1994 | |
| JP | H06178464 A | 6/1994 | |
| JP | H08501435 A | 2/1996 | |
| JP | 10208804 A | 8/1998 | |
| JP | H11123244 A | 5/1999 | |
| JP | H11506646 A | 6/1999 | |
| JP | 11188113 A | 7/1999 | |
| JP | H11225119 A | 8/1999 | |
| JP | 11338983 A | 12/1999 | |
| JP | 2000134830 A | 5/2000 | |
| JP | 2000270501 A | 9/2000 | |
| JP | 2001238372 A | 8/2001 | |
| JP | 2001309579 A | 11/2001 | |
| JP | 2002078247 A | 3/2002 | |
| JP | 2002325457 A | 11/2002 | |
| JP | 2004153879 A | 5/2004 | |
| JP | 2004194444 A | 7/2004 | |
| JP | 2006102055 A | 4/2006 | |
| JP | 2006136045 A | 5/2006 | |
| JP | 2006517778 A | 7/2006 | |
| JP | 2006230129 A | 8/2006 | |
| JP | 2007206776 A | 8/2007 | |
| JP | 2007228794 A | 9/2007 | |
| JP | 2009501510 A | 1/2009 | |
| KR | 19980703719 | 12/1998 | |
| WO | WO-2005109597 A1 | 11/2005 | |
| WO | WO-2006101614 | 9/2006 | |
| WO | WO-2007008646 A2 | 1/2007 | |
| WO | WO-2007084716 A2 | 7/2007 | |
| WO | WO-2007090168 A2 | 8/2007 | |
| WO | WO-2007095267 A2 | 8/2007 | |

OTHER PUBLICATIONS

J. Schutz, et al., "Load Adaptive Medium Frequency Resonant Power Supply", IEEE, Feb. 2002 pp. 1-6.

Jonathan Fildes., "Physics promises wireless power", BBC News, http://users.erols.com/iri/EnewsDec9,2006.htm or http://news.bbc.co.uk/2/hi/technology/6129460.stm, Nov. 15, 2006.

Karalis et al., "Efficient wireless non-radiative mid-range energy transfer", MIT paper, publication and date unknown, believed to be 2007.

Karalis et al., "Wireless Non-Radiative Energy Transfer", MIT paper, publication and date unknown, believed to be 2007.

Kurs et al., "Wireless Power Transfer via Strongly Coupled Magnetic Resonances", Science Express, Jun. 7, 2007, pp. 83-86, vol. 317 No. 5834, DOI: 10.1126/science.1143254.

Kurs et al., "Wireless Power Transfer via Strongly Coupled Magnetic Resonances", scimag.org, Jul. 6, 2007.

Supplementary Partial European Search Report—EP08849739—Search Authority—Munich—dated Jul. 17, 2017.

* cited by examiner

WIRELESS POWER BRIDGE

This application is a continuation of U.S. application Ser. No. 12/040,783, titled "Wireless Power Bridge," filed on Feb. 29, 2008 which claims the benefit of U.S. Provisional Application No. 60/988,758, filed Nov. 16, 2007. Each of the above-identified applications is incorporated by reference herein in its entirety.

BACKGROUND

It is often desirable to provide electric power to an area that is separated from the main powered areas by a wall or window. The wall or window makes the use of an extension cord less practical to provide this power. For example, an extension cord might require that a window or door be left open to allow the cord to pass therethrough.

For example, it may be convenient to use a laptop PC on the balcony or terrace where there is no electrical socket. It may be useful to put sensors on the outside of a house, for example to power a burglar alarm or television monitor. It may be desirable to bring a television outdoors.

One way to do this is to wire the new area; to drill a hole through a wall for example. However, this may not be allowed, for example in a rental apartment or condo. It may be cost prohibitive and/or inconvenient. Or, the user simply might not want to do it.

SUMMARY

The present application describes a wireless power bridge that allows directing power wirelessly through a solid blocking element, e.g., a solid wall or a closed window.

Power is applied to one side of the element that is near a source of AC power. That power is wirelessly transmitted through a first tuned antenna, to a second tuned antenna. The second antenna is capable of being separated from the first antenna by a solid object. The second antenna receives the power and provides a power outlet.

The wireless power bridge may provide a power outlet for AC power, or DC power.

In an embodiment, a transmitting subsystem produces a local power hotspot that extends across a solid object, and in which wireless power can be received. The wireless power is received by a receiver on the other side of that local power hotspot.

BRIEF DESCRIPTION OF THE DRAWINGS

These and other aspects will now be described in detail with reference to the accompanying drawings, wherein.

DETAILED DESCRIPTION

Figure 1:
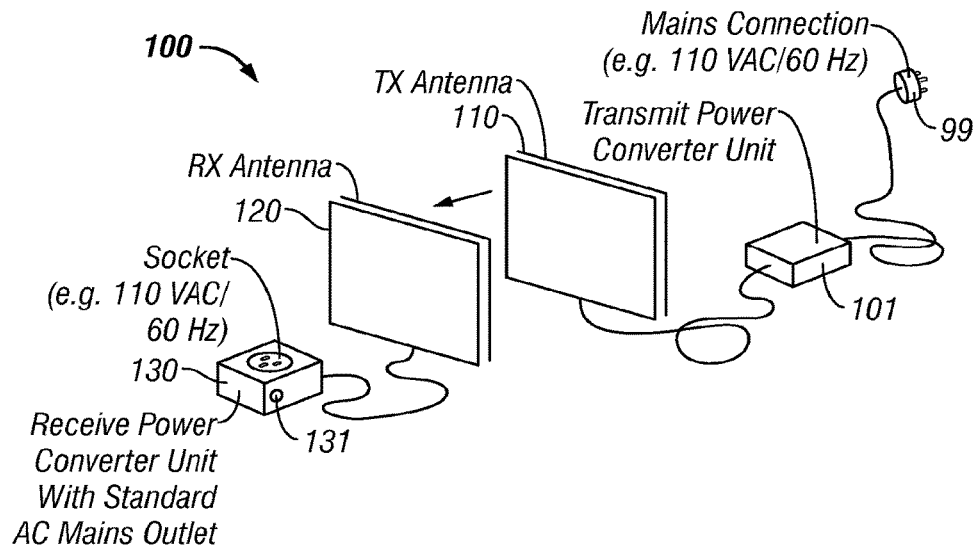
FIG. 1 shows a possible arrangement of the system using a low voltage DC output.

FIG. 1 illustrates an embodiment of a wireless power bridge. In this embodiment, the power output is an AC power output, for example producing a standard 110 VAC/60 Hz power. Another embodiment may produce different voltage output, for example, 208 V or any other standard AC voltage.

The embodiment produces power on a transmit side 100 by attaching via a wire to the standard AC power source. The power is coupled to a transmitting antenna 110, which is wirelessly sent via magnetic field coupling to a receiving antenna 120.

The preferred embodiment of a wireless power bridge is based on coupled resonance. Thus transmit and receiving antennas are preferably resonant antennas, which are substantially resonant, e.g., resonance frequency within a fractional bandwidth of 10%, 15%, or 20% of operating frequency. The operation and formation of the antennas may be as described in U.S. patent application Ser. No. 12/018,069, filed Jan. 22, 2008, entitled "Wireless Apparatus and Methods", the disclosure of which is herewith incorporated by reference.

The transmission is preferably a substantially non-modulated carrier frequency greater than or equal to 50 Hz. For example, the preferred frequency may be between 20 kHz and 135 kHz.

Another embodiment may use a much lower frequency. For example the standard AC power frequency of 60 Hz may be usable for wireless transfer.

An embodiment may create a near field in the area of the transmitter that stores energy magnetically in its near field, and the receiving antenna which removes energy from that near field.

The embodiment in FIG. 1 allows power transfer through an essentially nonmetallic wall. The size of the antenna, in turn, sets the thickness of the wall through which the power can be transmitted. For example, the wall may be as thin as a few millimeters, or as thick as 40 cm (16 inches).

The efficiency and amount of power transfer also depends on the size of the antenna. In a system based on coupled resonance, the antennas are resonant antennas and typically have a high Q factor, for example a Q factor greater than 200. With appropriately dimensioned elements, and using the techniques described herein, a power transfer through the output socket 130 or DC jack 232 of for example 100 W may be obtainable.

The embodiment uses an AC cord 99 to connect to the standard AC power, for example 110 V AC/60 Hz or 220 V AC/50 Hz. The power is coupled to a transmit power converter 101. Converter 101 converts the standard AC voltage and frequency into another voltage and another frequency; typically up converting frequency to a frequency value greater than 50 Hz. This higher frequency may be more appropriate to use for magnetically coupled wireless transmission.

In an alternative embodiment, as discussed above, the standard AC power frequency of 50 or 60 Hz may also be used for wireless power transmission.

The transmit antenna 110 is preferably a flat-panel antenna that is substantially resonant with the operating frequency produced by the converter unit 101. The receiving antenna 120 is preferably also a flat-panel unit that uses an inductive loop, e.g. a single or multiple turn inductor, and a capacitor to achieve resonance at the set operating frequency. The energy is transferred between the resonant antennas.

The power from the receiving antenna is coupled to a receive power converter unit that in a first embodiment (130) integrates an AC-to-AC frequency converter. This operates to create 50 Hz or 60 Hz AC power. This may also adjust and stabilize the voltage to the desired voltage, for example 110 or 220 V AC.

Figure 2:
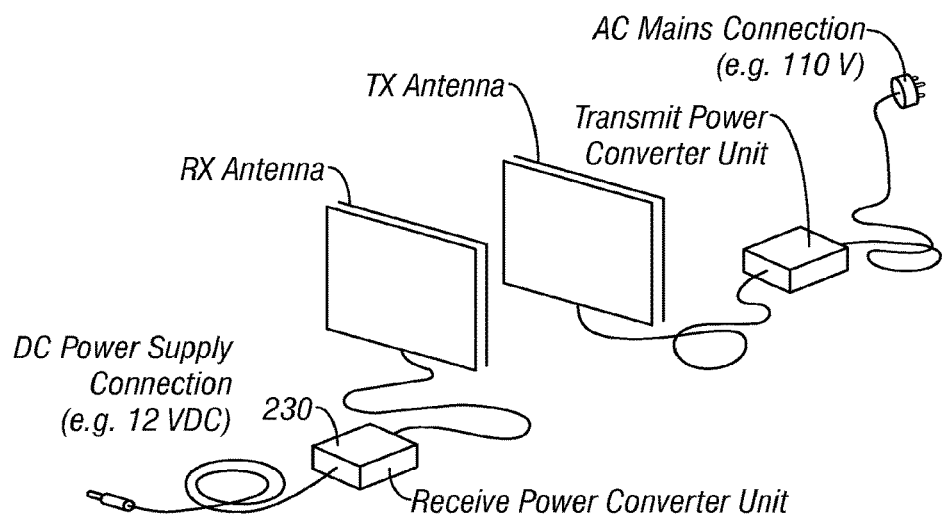
FIG. 2 shows a possible arrangement of a system using a standard AC voltage output (e.g. 110 VAC/60 Hz)

An alternative embodiment, shown in FIG. 2, uses a different style of receive power converter unit 230 which produces for example 12 V DC at its output. This may simply use a rectifier and DC-to-DC converter.

Figure 3:
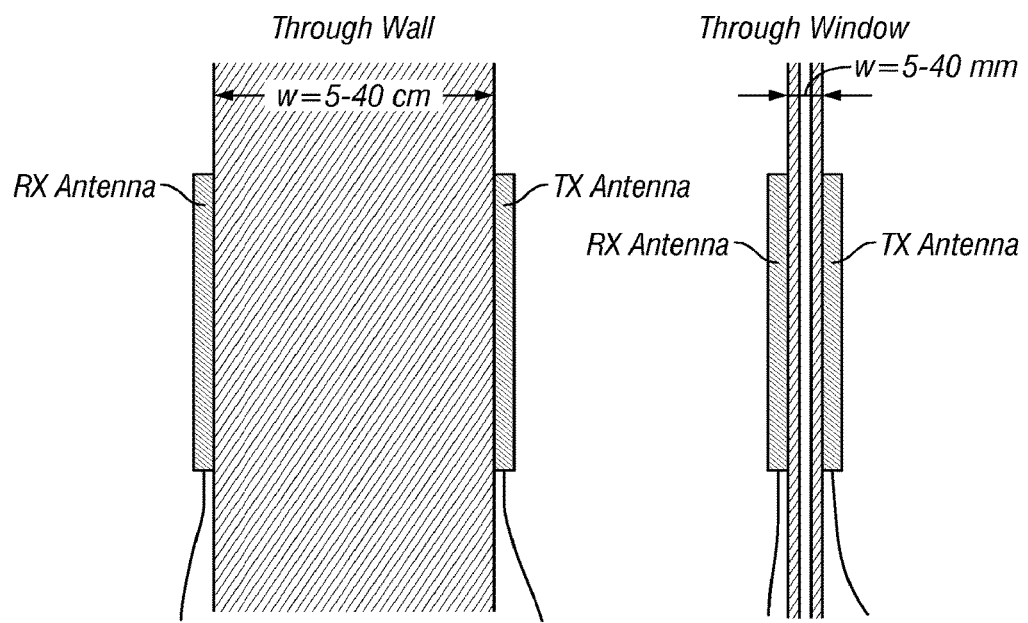
FIG. 3 shows transmission through wall and windows.

FIG. 3A illustrates an arrangement of using the antennas to transfer power through a wall. The wall in FIG. 3A may be for example between 5 and 40 cm (2 to 16 inches).

The coupling factor between the transmitting antenna and receiving antenna may differ significantly for the different materials and thicknesses of the wall. Accordingly, a control system may be used to automatically adapt in order to meet the power requirements of the receive side and to maximize the overall transfer efficiency. FIG. 3B illustrates transmission through a window which is 5 to 40 mm (0.2 to 1.6 inch) in thickness, for example.

Power transfer efficiency can be maximized when the transmit and receive antennas are coaxially positioned, or positioned parallel to one another. FIGS. 3A and 3B show cross-sections in which these antennas are coaxially aligned. In practice, however, this coaxial alignment may be reasonably easy for a transparent barrier such as a window, but may be more difficult for a solid barrier such as a wall. In another embodiment, it may be desirable to change the relative positioning of the antennas so that they are offset from one another, to avoid, for example, mismatching and detuning effects.

An embodiment may use an indicator as part of the transmit power converter unit 101 and/or the receive power converter unit 130 or 230. In a preferred embodiment, that indicator may be part of receive power converter unit 130 or 230. The indicator is shown as 131 in FIG. 2 and FIG. 3. It is controlled by the system that continuously computes transfer efficiency from a set of measurement values provided by sensors inherent to receive power converter unit 130 or 230 and from known system parameters. If the indicator is a light source, the indicator may glow brighter when the system operates more efficiently thus capable to transfer higher power, and less brightly when the transfer efficiency becomes lower thus providing less power transfer capability. This can help define the optimum position of the receive antenna by increasing the brightness of the indicator. A user of the system can move one or the other of the antennas and watch the indicator glow more or less brightly as the antennas move.

Another embodiment can use a numerical display or an analogue indicator dial with an electronically displayed bar or with a mechanical needle and relative numbers. The bar or the needle moves, for example, to show that the antennas are coaxially aligned.

Another embodiment may use an audible tone, for example, that is turned on during a time of antenna alignment, and emits a sound that changes pitch and/or intensity to show alignment of the antennas.

Figure 4:
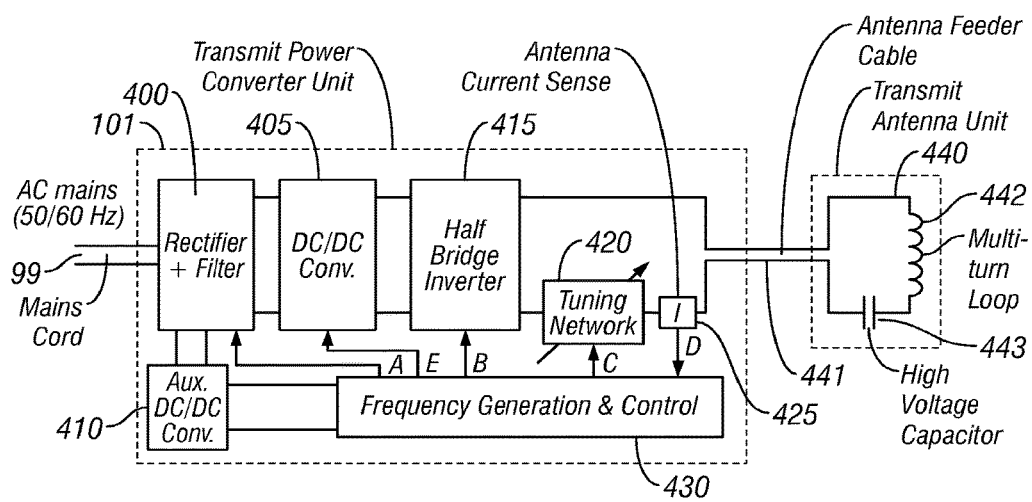
FIG. 4 shows a transmit subsystem.

FIG. 4 illustrates the transmit subsystem including the transmit power converter unit 101. AC power 99 is input to a rectifier and filter 400 which generates a DC voltage to operate the transmit power converter unit 10. A DC-to-DC converter 405 provides power for energizing the power stage here the half bridge inverter 415 and other parts of transmit power converter unit 101. Converter 405 may be a step-down converter that provides an output DC voltage that is lower than the input voltage and that can be controlled for the purpose of power and efficiency control. An auxiliary DC-to-DC converter 410 may also be used to supply another fixed DC voltage for the control systems such as the frequency generation and control unit. A single fixed voltage (e.g., 12 v) may be used for all systems, allowing only a single converter 405 to be used.

Another embodiment may omit the DC-to-DC converter 405. In this case the power stage here the half bridge inverter 415 may be directly supplied from the rectifier and filter 400.

According to a preferred embodiment as disclosed herein, the entire system operates without transformers what principal power conversion concerns. Transformers may be used as part of AC current sensors, in order to reduce the amount of magnetic noise which is present and/or to reduce the weight and/or volume, and/or produce a continuously variable output voltage. As described herein, an embodiment allows all principle power conversion to be carried out by electronic switched-mode power conversion, and it may also include for example charge pumping and the like.

A tuning network 420 may be used to fine tune the resonance frequency of the transmitting antenna system to match the operating frequency in order to maintain the highest possible transfer efficiency.

The antenna current may also be measured by a current sensor 425 that produces an output at interface D. This output may represent both magnitude and phase of the antenna current which may be needed for power and efficiency control.

Frequency generation and control subunit 430 may synchronize and control the operations of the transmit power converter unit 101. In an embodiment, and as shown in FIG. 4, some of a number of different functions are frequency-controlled. The frequency generation and control subunit may generate one or multiple frequencies to control these functions of the transmit power converter unit 101. For example, one or several frequency outputs can be created to respectively control the frequency used by a rectifier/filter 400; frequency used by DC-to-DC converter 405; and a frequency used by an inverter 415. The antenna current measurement output (interface D) can be used by the frequency generation and control unit 430 to optimally adjust resonance frequency of the transmitting antenna.

A transmit power converter unit 101 of a wireless power bridge dimensioned to transfer 100 W may have a rectangular form factor of 3 inches by 6 inches by 1 inch, and look similar to external power supply for a laptop computer.

The power stage that generates the power carrier as used for the wireless power transmission is preferably a half bridge inverter 415. This may use two electronic power switches, for example FETs or transistors in a push pull configuration. The frequency generation and control subunit 430 provides the driving switching waveform via interface B and thereby sets the operating frequency used for wireless power transfer as well as the antenna current. This switching waveform may be adjusted, for example, based on the sensed characteristics of the receive subsystem and its behavioral pattern.

The frequency generation and control subunit 430 may modify parameters to change the DC supply voltage of the power stage, and the duty cycle/pulse width of the switching waveform for the inverter 415. In an embodiment where the DC-to-DC converter is not used, the duty cycle of the switching waveform may be used to change power and transfer efficiency. For example, in one embodiment where a standard AC power frequency is used for wireless power transmission, the power stage can be formed of a phase controlled modulator controlled by the frequency generation and control subunit 430.

The tuning network 420 is used to maintain the resonance frequency of the transmitting antenna at the operating frequency of the wireless power bridge. In a preferred embodiment this operating frequency is fixed and derived from a crystal stabilized oscillator. This method is in contrast to solutions where the transmission frequency is adapted to the resonance frequency of the transmitting antenna. This method herein is considered advantageous to reduce risk of harmful interference to other systems, as well as to achieve regulatory compliance. The tuning network may also compensate for detuning effects and component tolerances (inductor, capacitor, antenna feeder cable, etc.). Detuning effects may be caused by a detuned receiving antenna as well as by extraneous objects in proximity to the transmitting antenna. A reactive component in the source impedance of the power stage may also cause detuning. The tolerances of the components may be attributed to aging of the components as well as fabrication tolerances. The tuning network is controlled by frequency generation and control subunit via the interface C.

The frequency generation and control subunit 430 also generates frequency and switching waveforms to drive the power stage here the half bridge inverter. It also may measure or monitor the transmit antenna current using the current sensed by the current sensing element 425. For example, the control unit 430 can be a processor or microcontroller executing an appropriate algorithm also using prestored data (lookup table). The lookup table may be created by using a defined calibration routine. This algorithm is designed in such a way to converge at maximum transfer efficiency for any coupling factor and—if possible—to meet the required voltage and power at the receive subsystems AC or DC output.

If no receiver can be detected or the coupling to this receiver is too small, the transmit subsystem may automatically enter a stand-by mode where it operates at a reduced power level or with intermittent transmission just sufficient to detect presence of a receiver. Presence detection of a receiver can be accomplished through stimulating and sensing the characteristics of a receiver and its behavioral pattern.

A human interface as part of the transmit power converter unit 101 can also be provided to manually modify certain parameters, for example to manually activate/deactivate the transmit subsystem and to set limits on power transfer.

The transmitting antenna unit 110 is a purely passive device fed over a feeder cable 102 from the transmit power converter unit 101. This feeder cable can be for example 1 m in length and sized to carry voltages and currents at values similar to those used in a standard 110V/220V AC power cord. The transmit antenna itself may include a single or multi-turn loop 442 in series with a high-voltage capacitor 443. This forms an LC tank circuit which is a resonant system tuned to the operating frequency dictated by the transmit power converter unit 101.

The antenna loop is preferably formed of insulated copper wire, having insulation that is sized to withstand the antenna voltage that could occur in a worst-case analysis. In some designs, the RMS voltage of this antenna may be above 1000 V depending on the actual power rating and the maximum transmission distance. Assuming an operating frequency between 20 kHz and 135 kHz, stranded wire with insulated strands, also called "litz wire" may be used to reduce any losses caused by eddy currents such as skin and proximity effects. This may also maximize the unloaded Q factor of the transmitting antenna.

In a similar way, the capacitor may need to withstand RMS voltages greater than 1000 V depending on the system's actual power rating and the maximum transmission distance.

Figure 6:
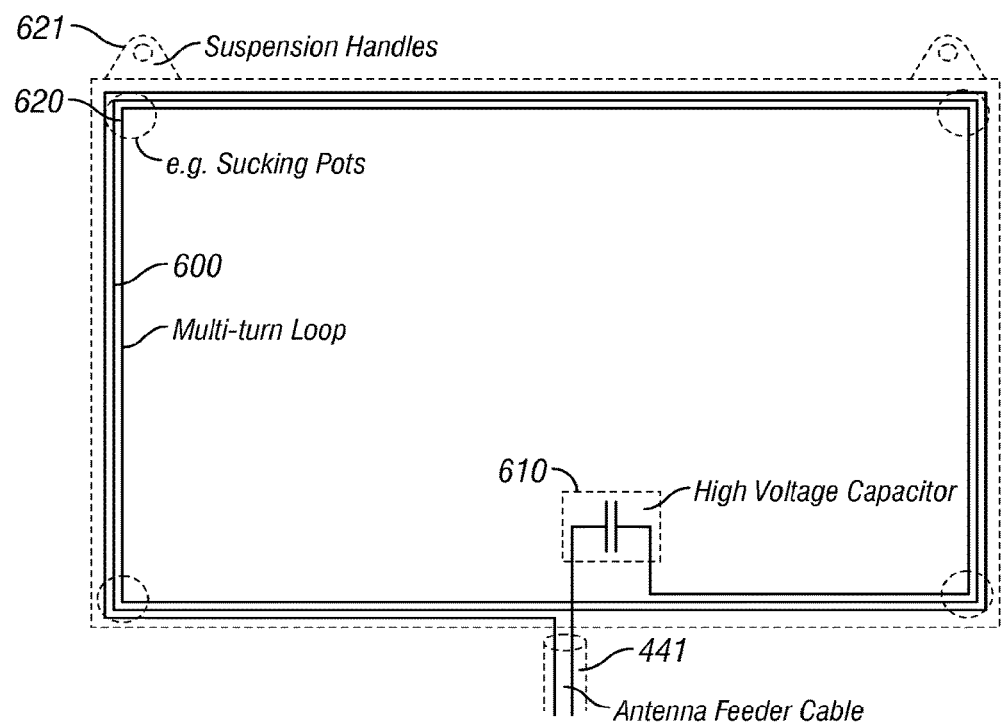
FIG. 6 shows a close-up detail of the antenna.

An antenna embodiment is shown in FIG. 6. A high-voltage capacitor 610 may be mounted in the interior of the loop in order to save space and allow the maximum loop size for a given outer contour form factor. A number of coaxial and insulated antenna loops shown as 600 are fed by the antenna feeder cable 102. A high-voltage capacitor 443 is integrated as part of the antenna unit in a way that allows the high-voltages resulting from resonance with a high Q factor to be maintained on the interior of the antenna, and to appear neither on the feeder cable 102 nor in the transmit power converter unit 101. This may simplify the design and relax certain requirements.

The transmit and the receiving antenna unit may both provide special fixtures that simplify its mounting. Suction cups 620 may be provided for temporary mounting. Suspension handles shown as 621 may be provided for more permanent mounting, or for temporary but recurrent mounting, e.g., on an item that may remain in place most of the time.

Figure 5:
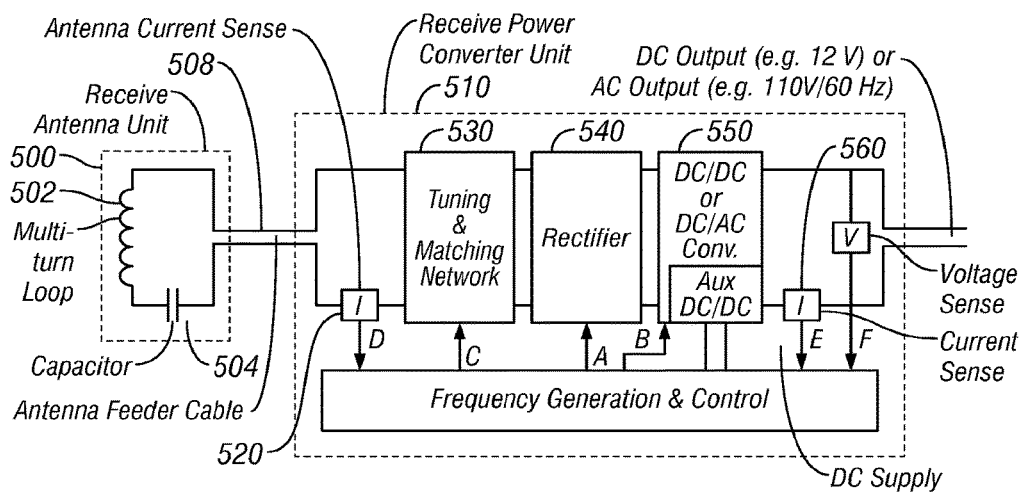
FIG. 5 shows a receive subsystem.

The receive subsystem is shown in detail in FIG. 5. This includes analogous structure to the transmit subsystem of FIG. 4. A receiving antenna unit 120 is formed with a single or multi-turn loop 502 and high voltage capacitor 504. The output from the receiving antenna unit is coupled via an antenna feeder cable 121 that feeds to the receive power converter unit 510. In general, this converter unit may use similar structure as that in FIG. 4, including all or any of an antenna current sense device 510, a tuning and matching network 530, a rectifier 540, DC-to-DC or DC-to-AC converter 550, the auxiliary DC-to-DC converter 551, additional current sense and voltage sense structure 560, and a frequency generation and control subunit 570.

The tuning and matching network 530 may be needed to ensure that receive antenna unit 120 is adjusted for resonance at the transmission frequency and that the rectifiers 540 input impedance is optimally matched to the receive antenna units source impedance 120. The tuning and matching network 530 is controlled by the frequency generation and control subunit 570 via interface C.

The rectifier 540 rectifies and filters the AC voltage as received by receive antenna unit 120 providing the DC required by the following stages. The rectifier 540 may be based on synchronous rectification instead of standard diode circuits in order to minimize power loss in case of low input voltage. The rectifier 540 may be controlled by the frequency generation and control subunit via control interface A.

The DC-to-DC or DC-to-AC converter 550 may be a step-down or step-up converter, respectively, providing an output voltage and current satisfying the requirements of the external load connected to the receive subsystem. In general, the output voltage or current generated by the DC-to-DC or DC-to-AC converter 550 is variable and controlled by the frequency generation and control subunit 570 via control interface B. In another embodiment, this converter 550 may be omitted. That means the external load is directly fed by the rectifier 540. In case the standard AC frequency was directly used for wireless power transmission, the converter 550 may be replaced by a phase controlled modulator.

The additional voltage and current sense 560 are used by the frequency generation and control subunit 570 to maintain the specified DC or AC output voltage and to monitor loading of the receive power converter unit 510.

The frequency generation and control subunit 570 automatically controls and monitors all relevant functions and parameters of the receive subsystem to satisfy voltage and current requirements of the external load and to maximize energy transfer efficiency, and generates all frequency signals and waveforms required to operate the receive power converter unit 510. If needed, it generates the standard AC frequency as required by the external load and feeds this frequency to the DC-to-AC converter 550 via control interface B. Additionally, it measures the antenna current by means of the antenna current sense 520, the DC or AC output voltage and current by means of the voltage and current sense 560, respectively. Based on these measurements, it computes and adjusts the relevant operational parameters and configurations of receive power converter unit 510 in order to satisfy voltage and power demand by the external load and to maximize energy transfer efficiency. The receive subsystems acts independently from the transmit subsystem, trying to satisfy power demand by the external load, whilst optimizing operating parameters at receive side in a manner to converge at maximum transfer efficiency.

In an embodiment, the system is capable of adapting to different levels of coupling factors, between a coupling factor close to 100% or 90% and a minimum coupling factor as low as 1%. This may adjust parts of the circuit automatically, based on these coupling factors.

The receive power converter unit 510 may provide a human interface for activating/deactivating receive power converter unit 510, to manually modify parameters or configurations, and an indicator for optimum positioning of the receive antenna as already described above.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

In one embodiment, the inverter may be omitted, and that half bridge inverter 420 will then be directly supplied by the rectifier and filter.

For example, other antenna forms and selections can be used. The term "power" as used herein can refer to any kind of energy, power or force transfer of any type.

The receiving source can be any device that operates from stored energy, including a computer or peripheral, communicator, automobile, or any other device.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The operations and/or flowcharts described herein may be carried out on a computer, or manually. If carried out on a computer, the computer may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop. Moreover, the method steps and operations described herein can be carried out on a dedicated machine that does these functions.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. An apparatus for transferring power wirelessly, comprising:
    a transmit antenna configured to transmit power wirelessly via a magnetic field; and
    a transmitting unit coupled to the transmit antenna, the transmitting unit comprising a control subunit configured to change a duty cycle of a switching waveform that causes the transmitting unit to intermittently transmit power, the transmitting unit configured to cause the transmit antenna to:
        transmit power wirelessly, via the magnetic field, at a first power level in a first mode;
        intermittently transmit power, via the magnetic field, at a second power level, lower than the first power level, in a second mode, the second power level sufficient to detect a presence of a receiver, and
        in the second mode, detect the presence of the receiver by stimulating and sensing the characteristics of the receiver and its behavioral pattern.

2. An apparatus as in claim 1, wherein the transmitting unit is further configured to cause the transmit antenna to transmit power wirelessly via the magnetic field at the first power level when the receiver is detected.

3. An apparatus as in claim 2, further comprising a resonant transmit circuit comprising the transmit antenna, the transmitting unit configured to tune a resonant frequency of the transmit circuit.

4. An apparatus as in claim 1, wherein the transmitting unit is further configured to enter into the second mode in response to detecting no receiver is present or when coupling of power to the receiver is below a specified level.

5. An apparatus as in claim 1, wherein the transmitting unit is configured to operate at a fixed frequency for wireless power transfer.

6. The apparatus of claim 1, wherein the transmitting unit comprises an indicator configured to indicate the presence of the receiver device.

7. A method of transferring power wirelessly, comprising:
    transmitting, via a magnetic field, power wirelessly at a first power level in a first mode;
    intermittently transmitting power, via the magnetic field, at a second power level, lower than the first power level, during a second mode, the second power level sufficient to detect a receiver device, wherein intermittently transmitting power comprises changing a duty cycle of a switching waveform;
    detecting a presence of the receiver device when the receiver device is positioned within the magnetic field at the second power level by stimulating and sensing the characteristics of the receiver device and its behavioral pattern.

8. A method as in claim 7, further comprising transmitting, via the magnetic field, power wirelessly at the first power level when a receiver device is detected.

9. A method as in claim 8, further comprising tuning a resonant frequency of a resonant transmit circuit configured to transmit the power wirelessly via the magnetic field.

10. A method as in claim 7, further comprising entering into the second mode when no receiver device is detected or when coupling of power to the receiver device is below a specified level.

11. A method as in claim 7, further comprising operating the transmitting unit at a fixed frequency for wireless power transfer.

12. The method of claim 7, further comprising indicating the presence of the receiver device.

13. An apparatus for transferring power wirelessly, comprising:
    means for transmitting, via a magnetic field, power wirelessly at a first power level in a first mode;
    means for intermittently transmitting power, via the magnetic field, at a second power level, lower than the first power level, during a second mode, the second power level sufficient to detect a receiver device, wherein the means for intermittently transmitting power comprises a means for controlling a duty cycle of a switching waveform; and
    means for detecting a presence of the receiver device when the receiver device is positioned within the magnetic field and the apparatus is operating at the second power level by stimulating and sensing the characteristics of the receiver device and its behavioral pattern.

14. An apparatus as in claim 13, wherein the transmitting means is configured to transmit, via the magnetic field, power wirelessly the first power level higher than the second power level when the receiver device is detected.

15. An apparatus as in claim 14, wherein the means for transmitting comprises a resonant means, and wherein the apparatus further comprises a means for tuning a resonant frequency of the resonant means for transmitting the power wirelessly via the magnetic field.

16. An apparatus as in claim 13, further comprising means for entering into the second mode when no receiver device is detected or when coupling of power to the receiver device is below a specified level.

17. An apparatus as in claim 13, wherein the transmitting means is further configured to enter into the second mode in response to detecting no receiver device is present or when coupling of power to the receiver device is below a specified level.

18. An apparatus as in claim 13, wherein the transmitting means is configured to operate at a fixed frequency for wireless power transfer.

19. The apparatus of claim 13, further comprising means for indicating the presence of the receiver device.

* * * * *